(12) United States Patent
Radcliff et al.

(10) Patent No.: US 7,043,912 B1
(45) Date of Patent: May 16, 2006

(54) APPARATUS FOR EXTRACTING EXHAUST HEAT FROM WASTE HEAT SOURCES WHILE PREVENTING BACKFLOW AND CORROSION

(75) Inventors: Thomas D. Radcliff, Vernon, CT (US); Duane McCormick, Colchester, CT (US); William Bilbow, Jr., Baldwinsville, NY (US)

(73) Assignee: UTC Power, LLC, South Windsor, CT (US)

( * ) Notice: Subject to any disclaimer, the term of this patent is extended or adjusted under 35 U.S.C. 154(b) by 0 days.

(21) Appl. No.: 11/025,756

(22) Filed: Dec. 27, 2004

(51) Int. Cl.
B60K 6/04 (2006.01)
F02B 35/00 (2006.01)
F01K 13/02 (2006.01)
F01K 21/06 (2006.01)
F01K 19/00 (2006.01)
B01D 19/00 (2006.01)
F01B 31/00 (2006.01)

(52) U.S. Cl. ............................. 60/597; 60/315; 60/316

(58) Field of Classification Search .................. 60/597, 60/315, 316
See application file for complete search history.

(56) References Cited

U.S. PATENT DOCUMENTS

| | | | | |
|---|---|---|---|---|
| 3,647,394 A | * | 3/1972 | Wetch et al. | 60/288 |
| 3,922,877 A | * | 12/1975 | Ophir et al. | 62/500 |
| 4,282,187 A | * | 8/1981 | Corbett et al. | 123/3 |
| 4,321,801 A | * | 3/1982 | Collard, Jr. | 62/500 |
| 4,339,547 A | * | 7/1982 | Corbett et al. | 423/232 |
| 4,345,440 A | * | 8/1982 | Allen et al. | 62/500 |
| 4,568,522 A | * | 2/1986 | Corbett | 422/186 |
| 5,151,022 A | * | 9/1992 | Emerson et al. | 423/245.3 |
| 5,184,501 A | * | 2/1993 | Lewis et al. | 73/863.01 |
| 5,647,221 A | * | 7/1997 | Garris, Jr. | 62/500 |
| 6,192,692 B1 | * | 2/2001 | Alsenz | 62/500 |
| 6,397,927 B1 | * | 6/2002 | Sterner | 165/80.3 |
| 6,546,812 B1 | * | 4/2003 | Lewis | 73/863.02 |

* cited by examiner

Primary Examiner—Sheldon J Richter
(74) Attorney, Agent, or Firm—Wall Marjama & Bilinski LLP

(57) ABSTRACT

In a waste heat recovery system wherein a heat exchanger derives heat from an engine exhaust, a venturi is fluidly connected to an engine exhaust port so as to thereby increase the flow rate and reduce the pressure in a manifold which is fluidly connected between the venturis and the heat exchanger. A fan is provided downstream of the heat exchanger to draw hot gases from the manifold, through the heat exchanger and discharge it to ambient. But when the fan is not operating during periods in which the engine is operating, the lower pressure manifold will draw ambient air in through the fan and through the heat exchanger, with the ambient air then being entrained in the exhaust gases being discharged from an exhaust channel downstream of the venturi. In one embodiment, a plurality of heat sources are provided with each having its own venturi connected to the common low pressure manifold. One or more of the plurality of waste heat source may be nonoperative or operating at a lower speed, but because of the low pressure manifold, the hot gases from the operative/higher speed waste heat source will not flow to the nonoperative or slower running waste heat source. Check valves are provided to allow the discharge of hot gases to ambient from the exhaust channels but not allow the flow of ambient air into the exhaust channels. A bypass valve is provided to selectively allow for the flow of ambient air into the exhaust channel and into the manifold for purposes of dilution during periods in which the fan is in operation.

17 Claims, 1 Drawing Sheet

US 7,043,912 B1

APPARATUS FOR EXTRACTING EXHAUST HEAT FROM WASTE HEAT SOURCES WHILE PREVENTING BACKFLOW AND CORROSION

BACKGROUND OF THE INVENTION

This invention relates generally to waste heat recovery systems and, more particularly, to a system for recovering waste heat from engine exhausts having corrosive elements therein.

Waste heat produced by a wide range of engines and industrial processes can be harnessed to provide benefits such as electricity, cooling, and water heating. Waste heat is often present in the form of a hot gas flow which is sometimes contaminated by corrosive elements such as sulfur and chlorine. These elements are relatively benign at elevated temperatures where they remain in gaseous form, but on cooler surfaces the gas may condense and cause acid dewpoint corrosion (ADC).

Interconnection of hot gas waste heat streams is often constrained by the existence of ADC. For example, to operate some waste heat recovery device it may be desirable to combine the exhaust streams of two reciprocating engines burning moderate sulfur fuel. If both engines are operating, then ADC is not present because the engine components and exhaust pipes are all above the dewpoint temperature. This situation changes when one of the engines is disabled. Now, higher pressure at the exhaust stack of the operating engine exhaust will cause backflow of exhaust into the cold, non-operational engine. Condensation and corrosion can progress quickly on the cold surfaces.

SUMMARY OF THE INVENTION

Briefly, in accordance with one aspect of the invention, a venturi is placed in each of a plurality of waste heat sources to produce a local pressure below the atmospheric ambient pressure, and a fan is provided to draw hot gases from a manifold passing through these venturis, through a heat exchanger, to the fan and out to ambient. In this way, when one of the waste heat sources is shut down, the hot gases from the other of the waste heat sources will not flow into that waste heat source and be condensed so as to cause corrosion.

In accordance with another aspect of the invention, each of the venturis has an associated check valve which allows the discharge of hot gases from the venturis through the check valve to ambient, but does not allow the flow of ambient air to flow into the check valve and into the venturi. Thus, when one or more of the waste heat sources is operating to discharge hot gases, but the fan is not operating, then the low pressure condition in the manifold will cause ambient air to flow into the fan, through the heat exchanger and into the low pressure manifold, and out the check valve.

By yet another aspect of the invention, a bypass valve is provided across each check valve such that, when the fan is operating, the bypass valve may be opened to allow for the inflow of ambient air to dilute the exhaust gases from the heat sources for the purpose of reducing temperature, concentration, or dewpoint of the flow to the heat exchanger.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
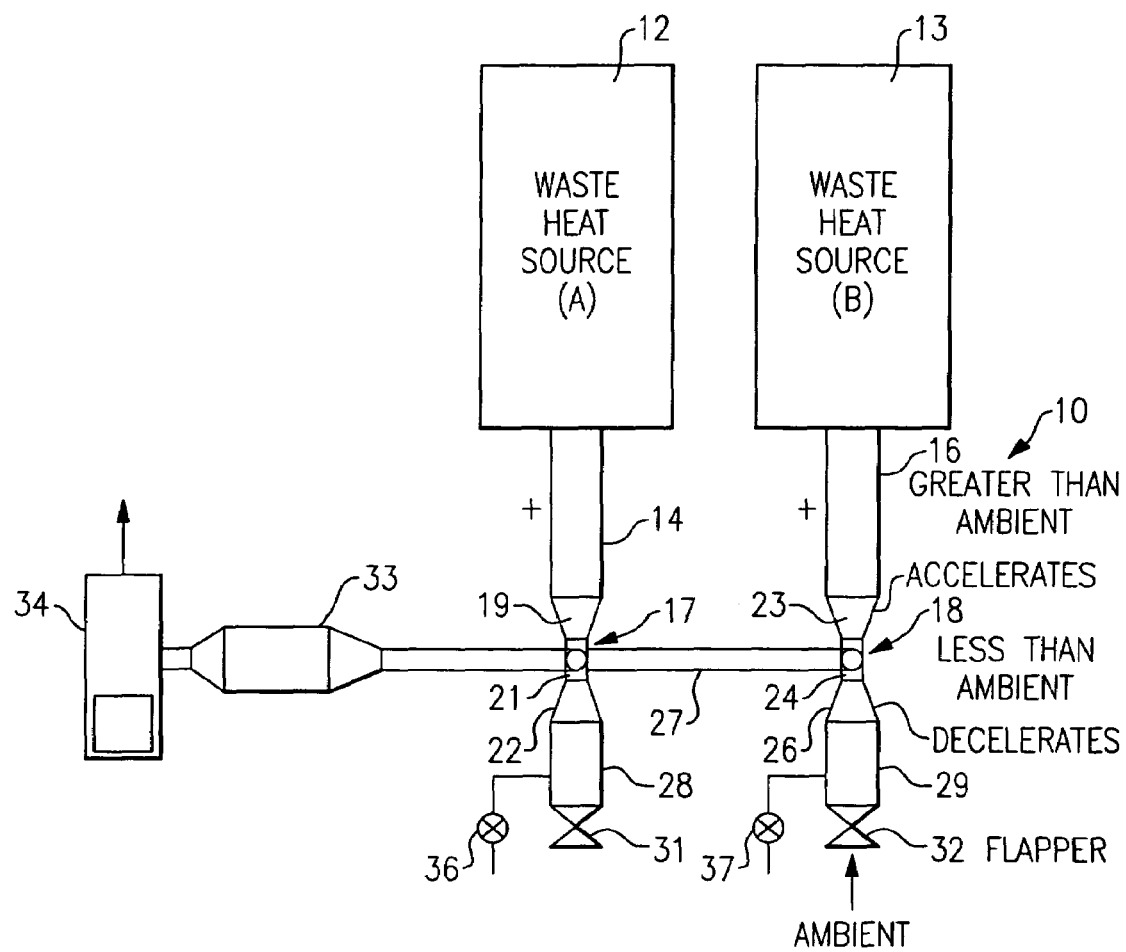
FIG. 1 is a schematic illustration of a waste heat recovery apparatus in accordance with one embodiment of the invention.

Referring now to FIG. 1, the invention is shown generally at 10 as applied to a heat recovery system for recovering waste heat from a plurality of waste heat sources as shown at 12 and 13. Although the invention will be described in terms of use with two waste heat sources, 12 and 13, it should be understood that the present invention is applicable to any number of such systems operating in parallel or to use with a single waste heat source.

One of the features of the present invention is to allow one or more of the waste heat sources to be in a nonoperating condition, or in a condition of operating at a lower speed, while one or more of the other waste heat sources in an operable condition at higher speeds. Normally, in these conditions, there is tendency for the hot gases from the operating waste heat source(s) to migrate to the nonoperating waste source(s), where it may condense and cause acid dewpoint corrosion (ADC). The present invention is intended to overcome this problem, as well as the problem of hot gases migrating to a heat exchanger during periods in which one or more of the waste heat sources is in operation but the waste heat recovery system is not in operation.

Returning to FIG. 1, the waste heat sources 12 and 13 include respective exhaust ports 14 and 16 for exhausting the hot gases therefrom. It is this hot gas which may normally be discharged to ambient to thereby result in wasted energy and to effect the environment. Accordingly, the present waste heat recovery system receives exhaust gas temperatures in the range of 500–1000° F., applies them to a waste heat recovery device and discharges the resulting gases at temperatures in the range of 200–350° F.

It should be recognized that the pressure in the exhaust ports 14 and 16, for a typical reciprocating engine, for example, is around ½ inch of $H_2O$ above atmosphere during periods of operation, and the pressure therein for any waste heat source that is not in operation is substantially equal to ambient pressure.

Located downstream of the exhaust port 14 and 16 are the respective venturis 17 and 18, which are provided for purposes of accelerating the flow and reducing the pressure below the atmospheric ambient pressure. That is, venturi 17 includes a converging portion 19, a central portion 21 and a diverging portion 22, and venturi 18 includes a converging portion 23, a central portion 24 and a diverging portion 26. The venturi central portions 21 and 24 are fluidly interconnected by a low pressure manifold 27 and are in a negative pressure in the range of ½ to 5 inches of $H_2O$ below atmosphere, for example.

The diverging portions 22 and 26 decelerate the flow of exhaust gases and cause an associated pressure rise to a level above ambient pressure as they enter the discharge channels 28 and 29, respectively. The discharge channels 28 and 29 include respective check valves 31 and 32 which allow for the flow of exhaust gases outwardly to ambient but prevent the flow of ambient air into the discharge channels 28 and 29.

The low pressure manifold 27 is fluidly connected to a heat exchanger 33, which, in turn, is fluidly connected to a fan 34 and to ambient air. The heat exchanger 33 operates to remove heat from the waste heat discharge gases and uses that heat to derive power by way of an organic rankine cycle system (not shown), or the like. The purpose of the fan 34 is to draw the hot gases to flow from the low pressure manifold 27, through the heat exchanger 33, and be discharged to ambient.

In operation, the system as described must be capable of operating with one or more of the waste heat sources 12 and 13 in operation but with the waste heat recovery devices (i.e. the heat exchanger 33 and fan 34) either in an operational mode or a nonoperational mode. Each of these operational conditions will now be discussed.

First, let us presume that waste heat source 12 is in operation, waste heat source 13 is shut down, and the fan 34 is shut down. Under these conditions, the pressure in the exhaust port 14 is well above ambient pressure while the pressure in the venturi central portion 21 and in the low pressure manifold 27 is below ambient, and the pressure in the discharge channel 28 is above ambient. As a result, the hot gases will be discharged from the check valve 31 and, because the pressure in the central portion 21 of the venturi 17 is less than ambient and the pressure in the central portion 24 of the venturi 18 is substantially at ambient pressure, the hot gases will not flow in the manifold 27 from the venturi central portion 21 to the venturi central portion 24. Further, since the pressure at the fan 34 is at ambient pressure, there will be a tendency for ambient air to be drawn in through the fan 34, pass through the heat exchanger 33 and enter the venturi 17 to be entrained in the exhaust gases flowing out the check valve 31. In this way, condensation of the hot gases in either of the nonoperable heat source 13 or the nonoperable heat exchanger 33 is prevented.

Consider now the operational condition wherein the waste heat source 12 is operational at full speed, the waste heat source 13 is operational at less than full speed, and the fan 34 is not operational. Under these conditions, the vacuums created by the respective venturis 17 and 18 are related to the associated source flow rates. That is, the flow rate and the associated vacuum will be less in the venturi 18 than in the venturi 17 such that the flow in the manifold 27 will be from the venturi 18 to the venturi 17. Under these conditions, the check valve 32 may or may not close since the pressure in the discharge conduit 29 is likely to be above ambient, but, because of the differential pressures in the venturis 17 and 18, at least a portion of the flow in the venturi 18 will be towards the venturi 17 and therefore be entrained into the exhaust flow of the venturi 17 to be discharged through the check valve 31. Accordingly, under no circumstance will the flow be able to propagate upstream of any flow restriction and therefore into an exhaust source. This feature ensures that any combination of operational, throttled or inoperative exhaust sources will not be subject to ADC when the waste heat recovery device is not engaged.

Considering now the condition of operation wherein one or more of the waste heat sources is operational and the fan 34 is operational to extract heat by way of the heat exchanger 33. For this purpose, the fan 34 is designed to provide sufficient suction to overcome the highest local vacuum present at the venturis 17 and 18. In this mode of operation, both of the check valves 31 and 32 will be closed and the exhaust gases from each of the sources 12 and 13 will be pulled from the venturis 17 and 18, through the manifold 27 and then through the heat exchanger 33 before being discharged to the atmosphere by the fan 34. In this condition, there will always be a vacuum within the manifold 27, and the fan 34 will always overcome that vacuum, so that, while the fan 34 is on operation, the flow will always be away from each waste heat source, no matter whether it is active or inactive. This feature therefore ensures that any combination of any operational, throttled or inoperative exhaust sources will not be subject to the ADC when waste heat recovery is engaged.

It has been recognized that, in some cases, it may be desirable to dilute the exhaust gases from the sources with ambient air to reduce temperature, concentration or dewpoint of the flow to the heat exchanger 33. This can be readily accomplished by the use of a bypass valve as shown at 36 and 37 as associated with exhaust channels 28 and 29, respectively. During periods in which the heat recovery apparatus is inactive (i.e. when the fan 34 is off), the bypass valves 36 and 37 will have no function since they are parallel to the respective open check valves 31 and 32. However, when the fan 34 is operational, and when one or more of the bypass valves 36 and/or 37 are open, a vacuum will act to close the check valve 31 and 32. Atmospheric air will then flow through the bypass valve(s) and mix with any active exhaust source streams at the venturi and manifold 27. By proper sizing or control of the bypass valve 36 or 37, any temperature, concentration or dewpoint between those at the exhaust ports 14 and 16 and the atmospheric ambient valves may be produced to meet the desired inlet condition for the heat exchanger 33.

While the present invention has been particularly shown and described with reference to the preferred embodiment as illustrated in the drawing, it will be understood by one skilled in the art that various changes in detail may be effected therein without departing from the spirit and scope of the invention as defined by the claims.

What is claimed is:

1. A method for preventing acid dewpoint corrosion in a waste heat recovery system having at least one waste heat source adapted to discharge hot gases from an exhaust port to a heat exchanger for purposes of waste heat recovery, comprising the steps of:

providing a venturi to fluidly interconnect said exhaust port to a manifold for reducing the pressure of the gases in the manifold to a level below ambient pressure;

providing a fan downstream of the heat exchanger for drawing the hot gases from the manifold, through the heat exchanger and then to the fan to be discharged to ambient; and providing a check valve which is fluidly interconnected to a downstream end of said venturi to allow hot gases to be discharged from said venturi to ambient during periods in which the fan is not operating but not allow ambient air to enter said venturi when the fan is operating.

2. A method as set forth in claim 1 wherein said at least one waste heat source comprises a plurality of waste heat sources, any one of which can be operated at a lower pressure than another.

3. A method as set forth in claim 1 wherein said at least one waste heat source comprises a plurality of waste heat sources, at least one of which may be shut down during periods in which another is operating.

4. A method as set forth in claim 1 and including an additional step of turning the fan off when said at least one heat source is discharging hot gases and so as to cause said manifold to draw ambient air through the fan and the heat exchanger so as to be entrained in the discharge of gases from the venturi.

5. A method as set forth in claim 1 including the step of providing a bypass valve at a downstream end of said venturi for selectively allowing the flow of ambient air into said venturi during periods in which the fan is in operation.

6. A heat recovery system in combination with at least one waste heat source having exhaust gases that contain corrosive elements which are harmful to associated apparatus if allowed to condense in the apparatus, comprising:
- an exhaust port fluidly connected to one of each of said at least one waste heat source to conduct the flow of exhaust gases therefrom;
- a venturi fluidly connected to one of each of said exhaust ports, said venturi(s) being adapted to increase the flow velocity of exhaust gases therethrough and thereby decrease the pressure therein to a level below ambient pressure;
- a low pressure manifold fluidly connected to said venturi(s) for receiving the flow of exhaust gases at a pressure below ambient;
- a heat exchanger fluidly connected to said manifold;
- a fan fluidly connected to said heat exchanger for drawings gases from said venturi(s) and through said manifold and said heat exchanger, to be discharged to ambient; and
- a check valve fluidly connected to one of each of said venturi(s) for allowing the discharge of gases from said venturi(s) to ambient but not allowing the flow of ambient air to flow into said venturi(s).

7. A heat recovery system as set forth in claim 6 wherein said at least one waste heat source comprises a plurality of waste heat sources and further wherein at least one of said plurality operates at a different pressure from another of said plurality.

8. A heat recovery system as set forth in claim 6 wherein said at least one heat source comprises a plurality of waste heat sources and further wherein at least one of said plurality of waste heat sources is shut down while another is operating.

9. A heat recovery system as set forth in claim 6 wherein said fan is designed to provide sufficient suction to overcome the low pressure in said manifold so as to cause the flow of hot gases from said manifold to said fan.

10. A heat recovery system as set forth in claim 6 wherein when the fan is not in operation, the lower pressure in said manifold is sufficient to cause ambient air to be drawn in through the fan and through the heat exchanger and then to be entrained in the discharge of gases from said venturi(s).

11. A heat recovery system as set forth in claim 6 and including a bypass valve fluidly connected to a downstream side of at least one of said venturis to be selectively opened to provide for the flow of ambient air into said at least one venturi during periods in which the fan is operating.

12. Apparatus for extracting waste heat from a plurality of waste heat sources at least one of which is nonoperable at times when another is operable, comprising:
- a plurality of exhaust ports each extending from a heat source for conducting the flow of hot gases from its respective waste heat source;
- a plurality of venturis with each being fluidly connected to one of said exhaust ports and operative to cause a reduction in pressure to a level below ambient pressure;
- a low pressure manifold fluidly attached to each of said plurality of venturis to provide fluid communication therebetween;
- a heat exchanger fluidly connected to said manifold;
- a fan fluidly connected to said heat exchanger for drawing gases from said manifold and through said fan to ambient therethrough; and
- a plurality of check valves with each being fluidly connected to one of said venturis for allowing the discharge of gases from said venturis to ambient but not allow the flow of ambient air into said venturi(s).

13. Apparatus as set forth in claim 12 wherein at least one of said plurality of waste heat sources operates at a different pressure from another of said plurality of heat sources.

14. Apparatus as set forth in claim 12 wherein at least one of said plurality of waste heat sources is shut down while another is operating.

15. Apparatus as set forth in claim 12 wherein said fan is designed to provide sufficient suction to overcome the low pressure in said manifold so as to cause the flow of hot gases from said manifold to said fan.

16. Apparatus as set forth in claim 12 wherein when the fan is not in operation, the lower pressure in said manifold is sufficient to cause ambient air to be drawn in through the fan and through the heat exchanger and then to be entrained in the discharge of gases from said venturi(s).

17. Apparatus as set forth in claim 12 and including a bypass valve that is attached to a downstream end of at least one of said venturis, said bypass valve being selectively operated to allow the passage of ambient air into said venturi during periods in which the fan is in operation.

* * * * *